United States Patent [19]

Meyn

[11] 4,339,848
[45] Jul. 20, 1982

[54] APPARATUS FOR REMOVING THE CUT OFF FEET OF A FOWL FROM AN OVERHEAD CONVEYOR SHACKLE

[76] Inventor: Pieter Meyn, P.O. Box 16, 1510 AA Oostzaan, Netherlands

[21] Appl. No.: 199,079

[22] Filed: Oct. 20, 1980

[51] Int. Cl.³ .............................................. A22C 21/00
[52] U.S. Cl. .......................................... 17/11; 17/44.1
[58] Field of Search ................ 17/44, 44.1, 44.2, 24, 17/11

[56] References Cited

U.S. PATENT DOCUMENTS

| | | | |
|---|---|---|---|
| 3,042,186 | 7/1962 | Varney | 17/11 X |
| 3,097,391 | 7/1963 | Wayne | 17/11 |
| 4,071,924 | 2/1978 | Meyn | 17/44.1 X |
| 4,195,386 | 4/1980 | Dodd | 17/11 X |

FOREIGN PATENT DOCUMENTS

| | | | |
|---|---|---|---|
| 7315638 | 5/1975 | Netherlands | 17/11 |
| 7502569 | 9/1976 | Netherlands | 17/11 |

Primary Examiner—Willie G. Abercrombie

[57] ABSTRACT

The apparatus for removing the cut off feet of a fowl from an overhead conveyor shackle is mounted in a 180° curve of the overhead conveyor and has a clamping wheel driven by the conveyor and cooperating with a stationary clamping bar for holding the shackle against any movement relative to the conveyor. The apparatus further has a plurality of unloading members, each supported by a slide block slidably mounted on vertical guides revolving with the clamping wheel. As a slide block is moved upwards the unloading member vertically wipes along the shackle held by the clamping wheel and the clamping bar, thereby tilting the feet out of the shackle.

5 Claims, 1 Drawing Figure

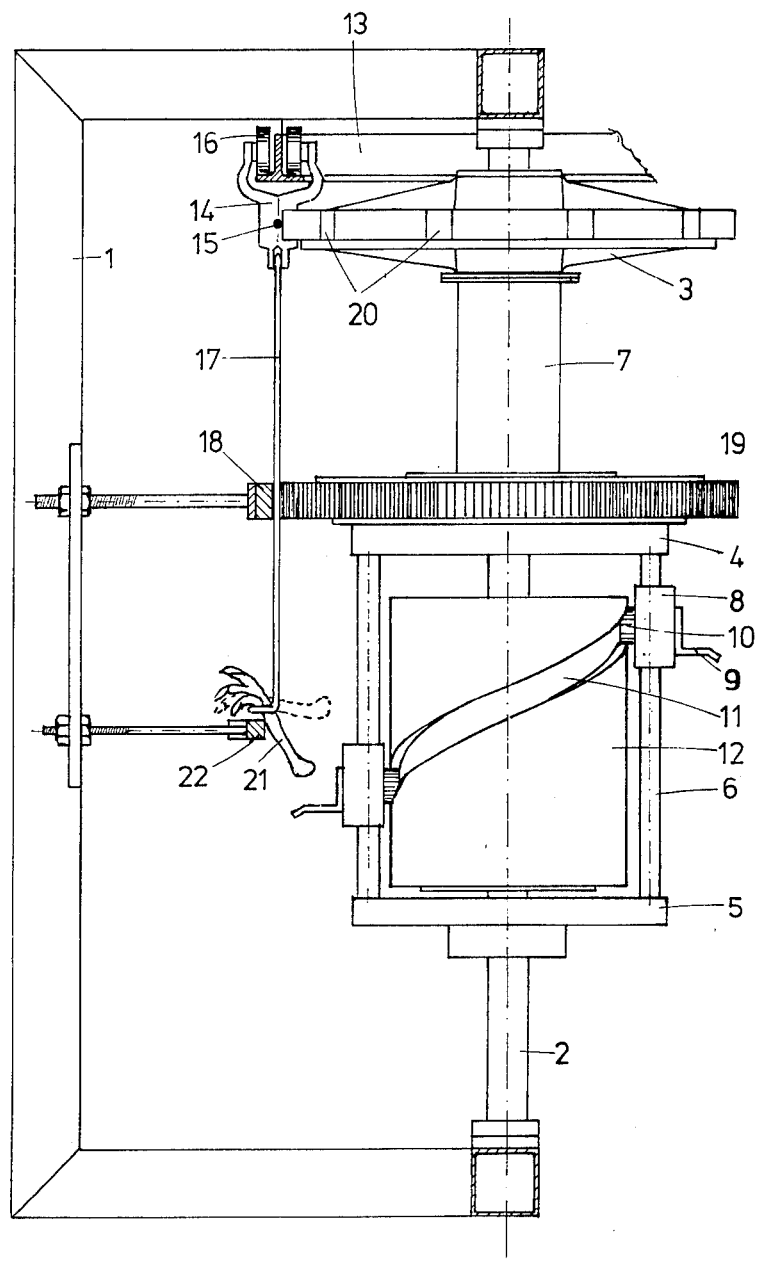

APPARATUS FOR REMOVING THE CUT OFF FEET OF A FOWL FROM AN OVERHEAD CONVEYOR SHACKLE

BACKGROUND OF THE INVENTION

The invention relates to an apparatus for removing the legs of a fowl from an overhead conveyor shackle. Devices of this kind are generally provided with clamping means for holding the shackle against any movement relative to the moving conveyor, as the fowl's feet or legs are contacted by an unloading member, which gradually lifts the feet out of the shackle.

U.S. Pat. No. 4,071,924 described a device of this kind which is used for unloading whole birds. In this device, which is installed in a 90° or 180° curve of the overhead conveyor, the clamping means consist of a clamping wheel driven by and concentric with the conveyor, which cooperates with a stationary clamping bar for holding the shackles, whereas the unloading member consists of a curved stationary guide bar, sloping upwards in the direction of travel of the conveyor. When unloading whole birds, which are held by their ankle joints in two tapering slots at the bottom of the shackle, it is sufficient to lift the legs so high that the knuckles may pass through a wider part of the slots, after which the bird's legs are pulled out of the shackle by the weight of the bird.

This known apparatus, however, has the disadvantage that it can not be used for unloading the cut off feet, which remain in the shackle when the bird's legs are cut through in the ankle joint. Since the claws of the bird are much wider than the knuckle of the ankle joint and the bird's weight is no longer there to assist the removal of the feet, the feet must be lifted up so high that they tip over length-wise out of the shackle. In order to achieve the height increase necessary for this, the slope of the guide bar would have to be so steep that the feet would be pushed away sideways and become tangled between the guide bar and the shackle, instead of being removed from the shackle.

SUMMARY OF THE INVENTION

It is therefore the main object of the invention to overcome the disadvantage described hereinabove.

According to the invention this object is realized with an apparatus of the kind specified, by means of at least one unloading member, which is supported by a slide block, which is slidably mounted on vertical guides which rotate with the clamping wheel in synchronisation with the overhead conveyor, in such manner that when the slide block is moved upwards relative to the conveyor, the unloading member wipes along the shackle held by the clamping wheel and the clamping bar, thereby lifting the birds feet out of the shackle.

This has the important advantage, that the feet are lifted out of the shackle by which only moves straight upwards relative to the shackle, so that no transversely directed forces occur, which could push the feet away to one side. Since the length of the unloading member does not have to exceed the width of the shackle very much, the front edge of the unloading member can be in parallel with the plane of the shackle so that it may be moved straight upwards in direct contact with the shackle to ensure that even broken feet or otherwise disfigured feet are removed from the shackle.

BRIEF DESCRIPTION OF THE DRAWING

Further objects, features and advantages of the invention will become apparent from the following description of an embodiment of the invention, taken in connection with the accompanying drawing, which shows a side view of an apparatus according to the invention.

DETAILED DESCRIPTION OF A PREFERRED EMBODIMENT

The apparatus shown in the drawing has a frame 1 with a central vertical shaft 2. A driving wheel 3, an upper wheel 4 and a lower wheel 5, are mounted for rotation on the central shaft at a distance over each other by means of ball bearings. The upper wheel 4 and the lower wheel 5 are interconnected by means of a plurality of pairs of guide bars 6, regularly spaced about the circumference of the wheels. The driving wheel 3 and the upper wheel 4 are interconnected by means of a connection sleeve 7.

On each pair of guide bars 6 a slide block 8 is slidably mounted. Each slide block 8 is provided with a generally L-shaped unloading member 9 on its outer surface and a follower roller 10 on its inner surface. The follower 10 cooperates with a stationary curve track 11 provided in a curve body 12 attached to the shaft 2.

A 180° curve overhead conveyor track section 13 is mounted in the frame 1 concentric with the central shaft 2. The conveyor further comprises a plurality of trolleys 14 attached to a pulling cable or chain 15 at regular intervals. Each trolley 14 is provided with rollers 16 running on the track 13. Each trolley 14 further supports a generally U-shaped shackle 17, with two tapered slots at the bottom for receiving the legs of a bird.

The apparatus hereinbefore described operates as follows:

When a shackle 17 of the overhead conveyor reaches the apparatus the side bars of the shackle are pressed into the toothed rim 19 of the upper wheel 4 by a clamping bar 18 which is adjustably mounted in the frame 1 concentric with the central shaft 2. At the same time the trolley 14 supporting this shackle is received in a notch 20 of the driving wheel 3. As the conveyor continues to move the driving wheel is pulled around by the trolleys of the conveyor. Because the upper wheel 4 is connected with the driving wheel 3, the shackle 17 held by the clamping rim 19 of the upper wheel 4 will be moved along in synchronisation with the overhead conveyor.

The bird's legs which remain hanging in the shackle 17 after the legs have been cut through in the ankle joint, are brought into contact with a stationary guide bar 22 attached to the frame 1, so that the legs 21 are swung upwards by the guide bar 22 as is shown in the drawing with broken lines.

One of the slide blocks 8 synchronously moving along with the shackle 17 is then moved upwards on is guide bars 6 by the follower roller 10 and the curve track 11, so that the unloading member 9 on the outside of the slide block 8 is brought into contact with the legs 21 sticking out from the shackle and then lifts the legs 21 up until they drop out of the shackle 17.

Because the forward edge of the unloading member 9 touches the shackle over the whole width thereof and only moves vertically upwards relative to the shackle even broken or otherwise misshapen legs are lifted out of the shackle.

It would also be possible to replace the forward edge of the unloading member 9 with a nylon brush the hair or wires of which would protrude past and through the shackle for literally wiping the legs out of the shackle.

I claim:

1. An apparatus for removing the cut-off feet of a fowl from a shackle of a continuously moving overhead conveyor, comprising a frame;

a support, movably supported by said frame;

a clamping means associated with said support, for gripping and holding said shackle against movement relative to said conveyor, during part of the path thereof;

first moving means for moving said support and said clamping means along in synchronisation with said conveyor, during said part of said path;

second moving means for additionally moving said support up and down relative to said conveyor and said clamping means;

an unloading member carried by said support and adapted to wipe the face of said shackle for lifting said feet out of said shackle as said support move upwards relative to said conveyor; and means for controlling said second moving means in such manner, that said support is in its lowermost position relative to said conveyor as said shackle is gripped by said clamping means, and has reached its uppermost position before said shackle is released again by said clamping means.

2. Apparatus according to claim 1, in which the width of said unloading member at least equals the width of said shackle.

3. Apparatus for removing the cut-off feet of a fowl from a shackle of a continuously moving overhead conveyor, comprising a frame with a vertical central shaft;

a rail attached to said frame for guiding said overhead conveyor through a 90°–180° bend along a circular path concentric with said shaft;

a horizontal wheel rotatably mounted on said shaft and driven by said overhead conveyor;

a horizontal clamping wheel connected with said driven wheel and cooperating with a counter pressure member mounted in said frame, for gripping and holding said shackle against movement relative to said conveyor;

a plurality of pairs of vertical slide bars connected with said clamping wheel and mounted for rotation about said shaft;

a slide block slidably mounted on each of said pairs of slide bars;

an unloading member carried by said slide block, adapted to wipe the face of said shackle for lifting said feet out of said shackle; and means for controlling the movements of said slide block in such manner, that said slide block is in its lowermost position on its said slide bars as said shackle is gripped by said clamping wheel, and has reached its uppermost position before said shackle is released again by said wheel.

4. Apparatus according to claim 3, in which the width of said unloading member at least equals the width of said shackle.

5. Apparatus according to claim 3, in which the shackle wiping edge of said unloading member is provided with a plurality of flexible elements, which protrude brush like beyond said face of said shackle as it is wiped by said unloading member.

* * * * *